(12) United States Patent
Chiu

(10) Patent No.: US 8,602,377 B2
(45) Date of Patent: Dec. 10, 2013

(54) TELESCOPIC STAND WITH CHAIN-TYPE LIFTING AND LOWERING FUNCTION

(75) Inventor: Chi-Hsiung Chiu, Shuishang Township, Chiayi County (TW)

(73) Assignee: Chi Nan Co., Ltd., Chiayi County (TW)

( * ) Notice: Subject to any disclaimer, the term of this patent is extended or adjusted under 35 U.S.C. 154(b) by 0 days.

(21) Appl. No.: 13/559,701

(22) Filed: Jul. 27, 2012

(65) Prior Publication Data

US 2013/0161472 A1    Jun. 27, 2013

(30) Foreign Application Priority Data

Dec. 22, 2011  (TW) ............................. 100224233 U

(51) Int. Cl.
*F16M 13/00* (2006.01)

(52) U.S. Cl.
USPC ....................... 248/422; 248/297.31; 248/404

(58) Field of Classification Search
USPC ................ 248/161, 162.1, 165, 166, 295.11, 248/296.1, 297.11, 297.31, 404, 407, 422
See application file for complete search history.

(56) References Cited

U.S. PATENT DOCUMENTS

| | | | | |
|---|---|---|---|---|
| 619,047 | A * | 2/1899 | Mayer | 74/422 |
| 1,694,243 | A * | 12/1928 | Wilford | 248/404 |
| 4,842,233 | A * | 6/1989 | Rusin | 248/405 |
| 4,850,563 | A * | 7/1989 | Grout | 248/422 |
| 5,058,446 | A * | 10/1991 | Guey | 74/89.17 |
| 6,659,417 | B2 * | 12/2003 | Hsieh | 248/404 |
| 6,766,995 | B1 * | 7/2004 | Hsieh | 248/404 |
| 7,364,124 | B2 * | 4/2008 | Yuasa et al. | 248/125.8 |
| 2007/0267550 | A1 * | 11/2007 | Blankenship et al. | 248/125.8 |

* cited by examiner

*Primary Examiner* — Gwendolyn Baxter
(74) *Attorney, Agent, or Firm* — Alan Kamrath; Kamrath IP Lawfirm, P.A.

(57) ABSTRACT

A telescopic stand includes an outer tube, an inner tube, a chain, a housing, a driven member, a driving member, and a safety latch. The chain is secured on the inner tube. The housing is secured on the outer tube. The driven member is rotatably mounted in the housing and has a chainwheel and a worm gear. The chainwheel has engaging teeth meshing with the chain. The driving member is rotatably mounted in the housing and has a worm meshing with the worm gear. The safety latch is mounted on the housing and is movable to lock the driven member. Thus, when the inner tube bears a heavy load, the chainwheel co-operates with the chain to withstand the larger force applied by the inner tube and will not be worn or broken due to a larger rotation force.

5 Claims, 7 Drawing Sheets

TELESCOPIC STAND WITH CHAIN-TYPE LIFTING AND LOWERING FUNCTION

BACKGROUND OF THE INVENTION

1. Field of the Invention

The present invention relates to a stand and, more particularly, to a telescopic stand to support a heavy object, such as a sound and the like.

2. Description of the Related Art

A conventional telescopic stand in accordance with the prior art shown in FIG. 1 comprises a telescopically arranged tube assembly 20, a regulating rack 21 mounted on the tube assembly 20 and having a plurality of engaging teeth 211, a driving gear 22 meshing with the engaging teeth 211 of the regulating rack 21, and a rocking arm 221 connected with the driving gear 22. In operation, when the rocking arm 221 is rotated, the driving gear 22 is driven and rotated to drive the engaging teeth 211 of the regulating rack 21 and to move the regulating rack 21 so that the tube assembly 20 is extended or retracted so as to adjust the height of the tube assembly 20. However, when the tube assembly 20 bears a heavy load, such as a sound or the like, the driving gear 22 and the engaging teeth 211 of the regulating rack 21 are subjected to a larger force applied by the heavy load so that the driving gear 22 and the engaging teeth 211 of the regulating rack 21 are easily worn out or broken due to an excessive force during a long-term utilization.

BRIEF SUMMARY OF THE INVENTION

In accordance with the present invention, there is provided a telescopic stand, comprising an outer tube, an inner tube, a chain, a housing, a driven member, a driving member, and a safety latch. The outer tube has a periphery provided with a guiding slot. The inner tube is movably mounted in the outer tube. The inner tube has a periphery provided with a regulating track aligning with the guiding slot of the outer tube. The chain is secured on the regulating track of the inner tube to move the inner tube relative to the outer tube. The chain is partially exposed from the guiding slot of the outer tube. The housing is secured on the outer tube. The housing has an interior provided with a mounting hole mounted on the outer tube. The housing has two opposite sides each provided with a mounting sleeve for mounting the driven member. The housing has a periphery provided with a journal for mounting the driving member. The driven member is rotatably mounted in the housing and supported by the mounting sleeve of the housing. The driven member has a central portion provided with a protruding shaft rotatably mounted in the mounting sleeve of the housing. The driven member has a first side provided with a chainwheel and a second side provided with a worm gear. The chainwheel of the driven member has a periphery provided with a plurality of engaging teeth and a plurality of arcuate grooves defined between the engaging teeth. The engaging teeth of the chainwheel of the driven member extend through the guiding slot of the outer tube and mesh with the chain. The driving member is rotatably mounted in the housing and supported by the journal of the housing. The driving member has a first end provided with a worm meshing with the worm gear of the driven member. The driving member has a second end provided with a connecting rod connected with a rocking arm. The connecting rod of the driving member has a periphery provided with a collar mounted in the journal of the housing. The safety latch is mounted on the housing and is movable into one of the arcuate grooves defined between the engaging teeth of the chainwheel of the driven member to stop rotation of the driven member.

The primary objective of the present invention is to provide a telescopic stand with a chain-type lifting and lowering function.

According to the primary advantage of the present invention, the engaging teeth of the chainwheel of the driven member mesh with the chain solidly and stably so that even when the inner tube bears a heavy load, the chainwheel co-operates with the chain to withstand the larger force applied by the inner tube and will not be worn out or broken due to a larger rotation force.

According to another advantage of the present invention, the safety latch is extended into and locked in one of the arcuate grooves between the engaging teeth of the chainwheel of the driven member to lock and stop rotation of the driven member so as to stop movement of the inner tube relative to the outer tube and to provide a safety locking function.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
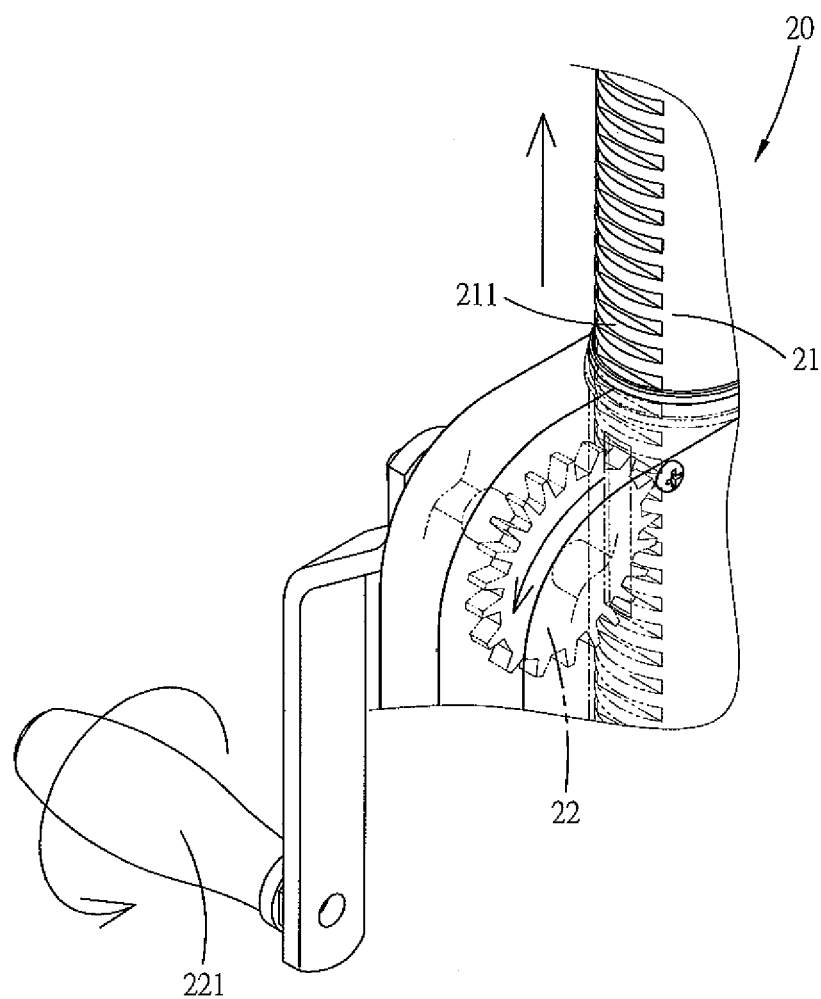
FIG. 1 is a partially perspective view of a conventional telescopic stand in accordance with the prior art.
Figure 2:
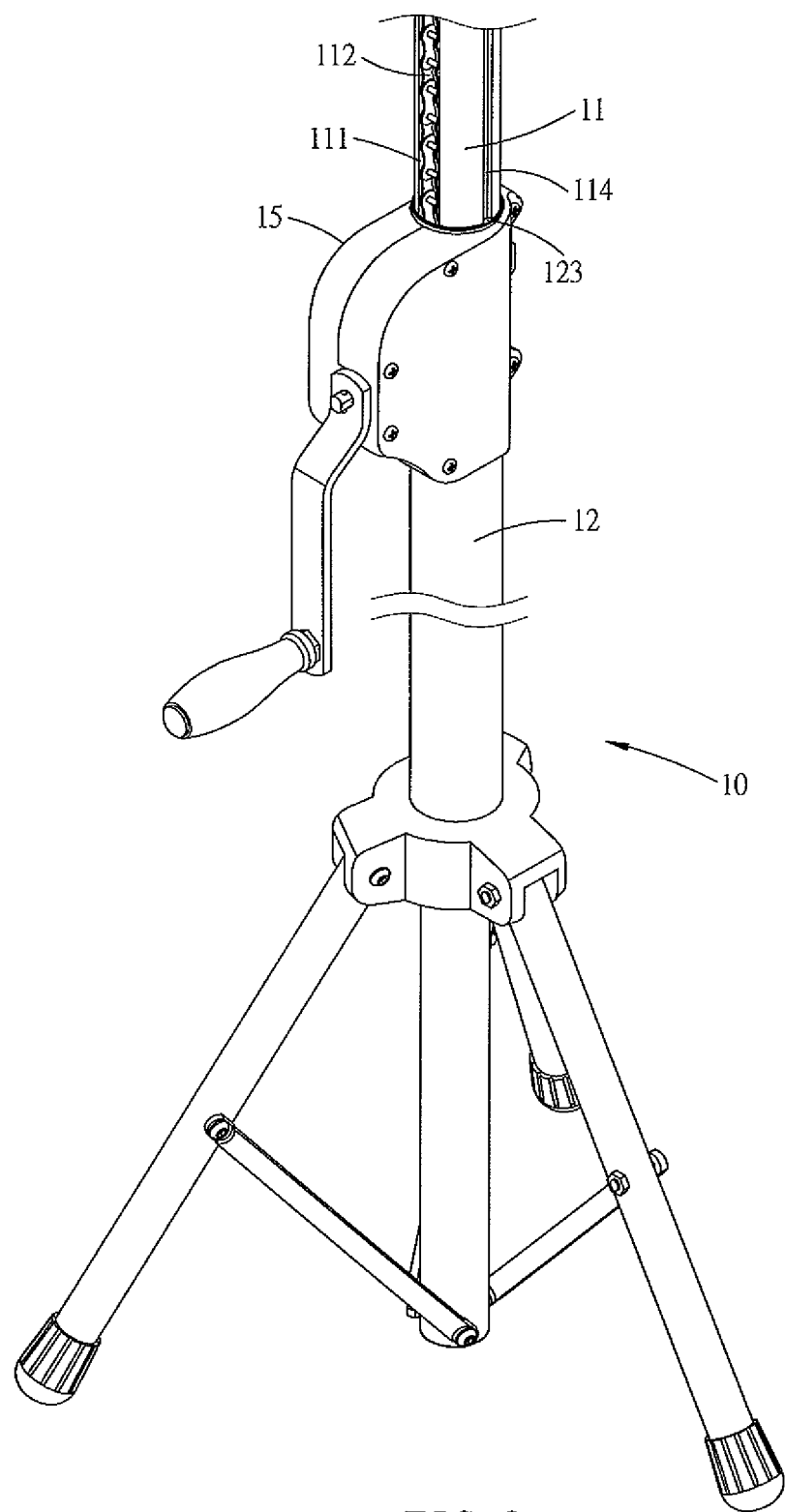
FIG. 2 is a partially perspective view of a telescopic stand in accordance with the preferred embodiment of the present invention.
Figure 3:
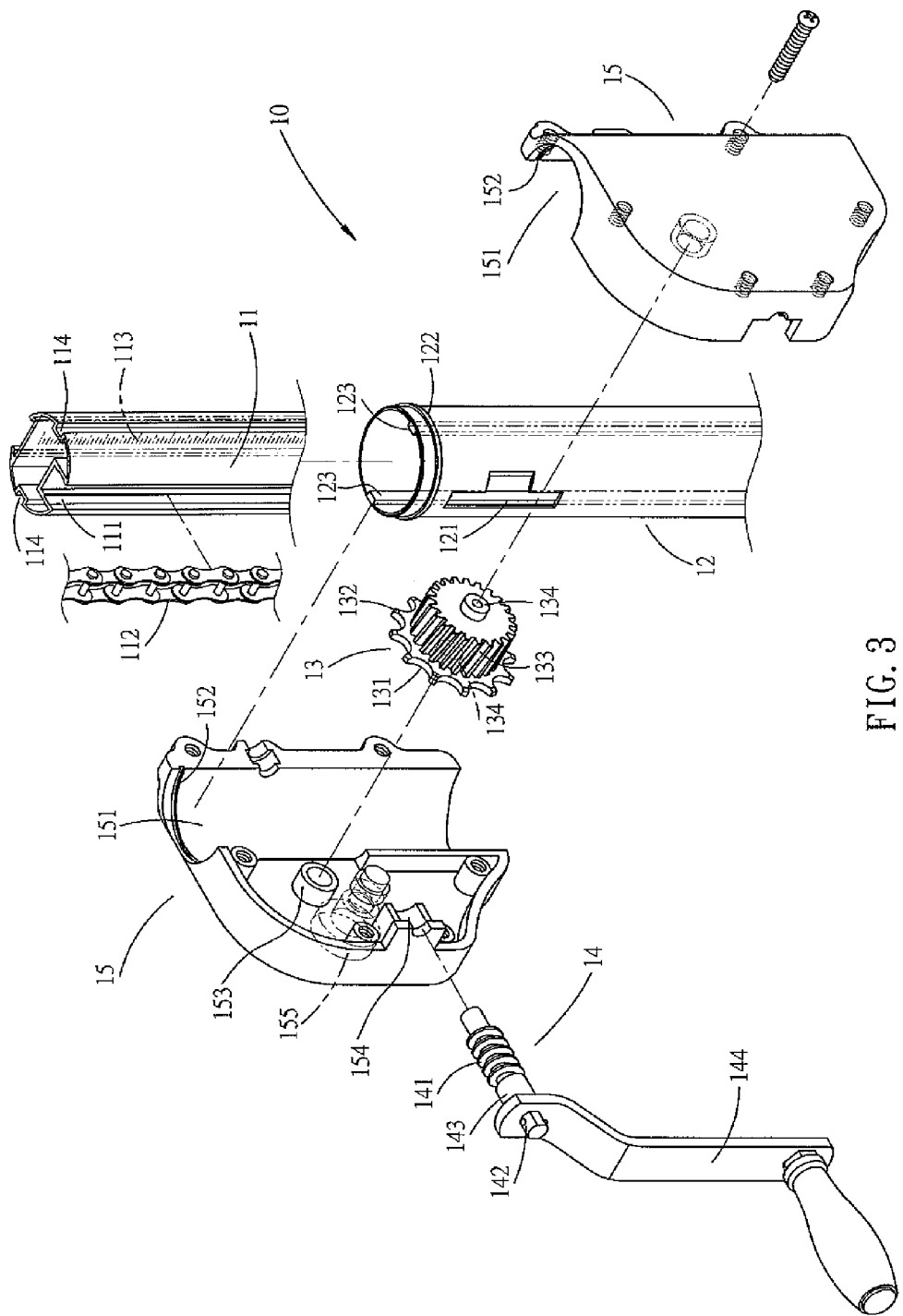
FIG. 3 is an exploded perspective view of the telescopic stand as shown in FIG. 2.
Figure 4:
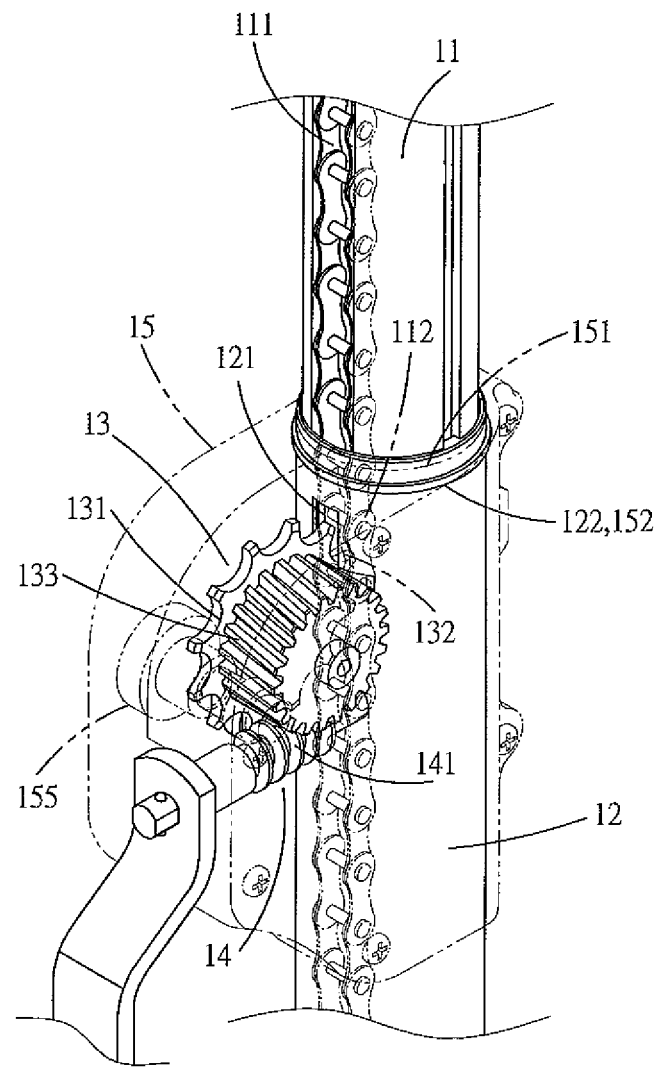
FIG. 4 is a partially perspective broken view of the telescopic stand as shown in FIG. 2.
Figure 5:
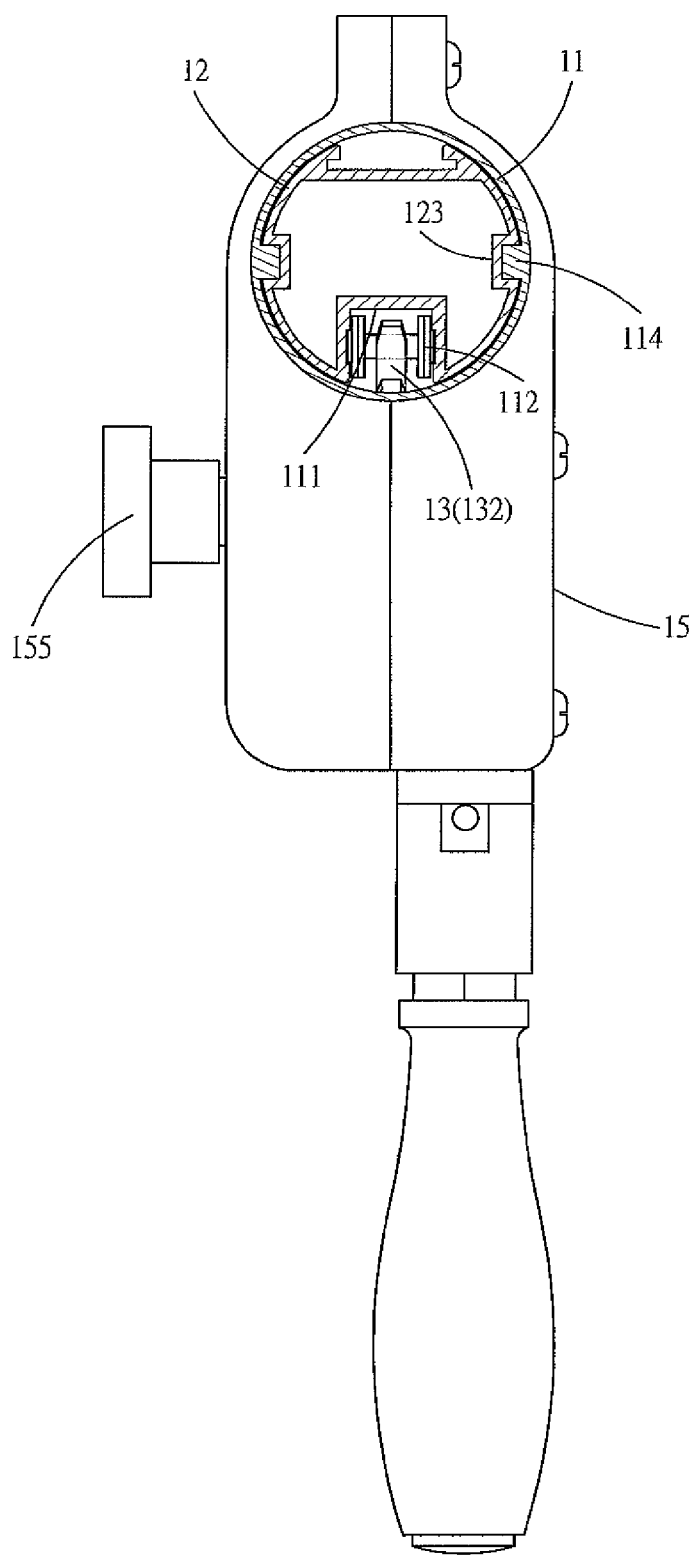
FIG. 5 is a top cross-sectional view of the telescopic stand as shown in FIG. 2.
Figure 6:
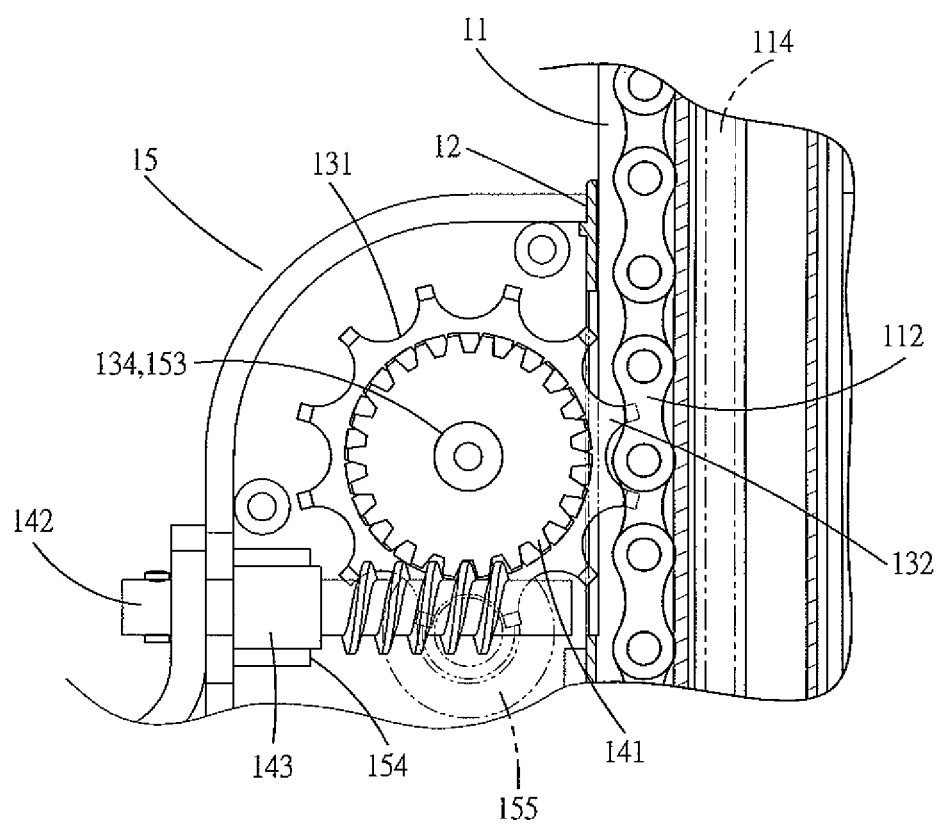
FIG. 6 is a partially side cross-sectional view of the telescopic stand as shown in FIG. 2.

Referring to the drawings and initially to FIGS. 2-6, a telescopic stand 10 in accordance with the preferred embodiment of the present invention comprises an outer tube 12, an inner tube 11, a chain 112, a housing 15, a driven member 13, a driving member 14, and a safety latch 155.

The outer tube 12 has a periphery provided with a guiding slot 121 which has an elongate shape. The outer tube 12 has an inner wall provided with two opposite limit ribs 123 each extending in a longitudinal direction of the outer tube 12. The outer tube 12 has a top provided with a retaining flange 122.

The inner tube 11 is movably mounted in the outer tube 12. The inner tube 11 has a periphery provided with a regulating track 111 aligning with the guiding slot 121 of the outer tube 12. The regulating track 111 extends in a longitudinal direction of the inner tube 11. The inner tube 11 has a surface provided with a scale 113 which extends in the longitudinal direction of the inner tube 11 to indicate a height of the inner tube 11 relative to the outer tube 12. The inner tube 11 has an outer wall provided with two opposite limit channels 114 each extending in the longitudinal direction of the inner tube 11. Each of the limit channels 114 of the inner tube 11 is slidable on a respective one of the limit ribs 123 of the outer tube 12 to allow an axial movement of the inner tube 11 relative to the outer tube 12 and to prevent the inner tube 11 from being rotatable relative to the outer tube 12.

The chain 112 is secured on the regulating track 111 of the inner tube 11 to move the inner tube 11 relative to the outer tube 12. The chain 112 is partially exposed from the guiding slot 121 of the outer tube 12.

The housing 15 is secured on the outer tube 12. The housing 15 consists of two shells which are juxtaposed to each other to encompass the outer tube 12 so that the outer tube 12 is clamped between the two shells of the housing 15. The housing 15 has an interior provided with a mounting hole 151 mounted on the outer tube 12. The housing 15 has two opposite sides each provided with a mounting sleeve 153 for mounting the driven member 13. The housing 15 has a periphery provided with a journal 154 for mounting the driving member 14. The housing 15 has a top provided with a retaining groove 152 abutting the retaining flange 122 of the outer tube 12. The retaining groove 152 of the housing 15 is connected to the mounting hole 151.

The driven member 13 is rotatably mounted in the housing 15 and supported by the mounting sleeve 153 of the housing 15. The driven member 13 has a central portion provided with a protruding shaft 134 rotatably mounted in the mounting sleeve 153 of the housing 15. The driven member 13 has a first side provided with a chainwheel 131 and a second side provided with a worm gear 133. The chainwheel 131 of the driven member 13 has a diameter greater than that of the worm gear 133. The chainwheel 131 of the driven member 13 has a periphery provided with a plurality of engaging teeth 132 and a plurality of arcuate grooves defined between the engaging teeth 132. The engaging teeth 132 of the chainwheel 131 of the driven member 13 extend through the guiding slot 121 of the outer tube 12 and mesh with the chain 112.

The driving member 14 is rotatably mounted in the housing 15 and supported by the journal 154 of the housing 15. The driving member 14 has a first end provided with a worm 141 meshing with the worm gear 133 of the driven member 13. The driving member 14 has a second end provided with a connecting rod 142 connected with a rocking arm 144. The connecting rod 142 of the driving member 14 partially protrudes outward from the journal 154 of the housing 15 and has a periphery provided with a collar 143 mounted in the journal 154 of the housing 15. The rocking arm 144 protrudes outward from the housing 15.

The safety latch 155 is mounted on the housing 15 and is movable into one of the arcuate grooves defined between the engaging teeth 132 of the chainwheel 131 of the driven member 13 to stop rotation of the driven member 13. The safety latch 155 is located adjacent to the mounting sleeve 153 of the housing 15. The safety latch 155 has a substantially T-shaped profile and has a first end provided with a rotatable latch head and a second end provided with a latch rod that is extended outward or retracted inward by rotation of the latch head. The latch rod of the safety latch 155 is aligned with and movable into one of the arcuate grooves between the engaging teeth 132 of the chainwheel 131 of the driven member 13.

In assembly, the inner tube 11 is mounted in the outer tube 12, with the regulating track 111 of the inner tube 11 aligning with the guiding slot 121 of the outer tube 12. At this time, each of the limit channels 114 of the inner tube 11 is slidable on the respective limit rib 123 of the outer tube 12 so that the inner tube 11 is movable linearly relative to the outer tube 12. Then, the driven member 13 and the driving member 14 are received in the housing 15 respectively, with the connecting rod 142 of the driving member 14 partially protruding outward from the journal 154 of the housing 15. Then, the two shells of the housing 15 are juxtaposed to each other to encompass the outer tube 12, with the retaining groove 152 of the housing 15 abutting the retaining flange 122 of the outer tube 12 so that the outer tube 12 is clamped between the two shells of the housing 15. At this time, the shaft 134 of the driven member 13 is mounted in the mounting sleeve 153 of the housing 15, and the collar 143 of the driving member 14 is mounted in the journal 154 of the housing 15. In addition, the engaging teeth 132 of the chainwheel 131 of the driven member 13 extend through the guiding slot 121 of the outer tube 12 and mesh with the chain 112, and the worm 141 of the driving member 14 meshes with the worm gear 133 of the driven member 13. Finally, the rocking arm 144 is connected with the connecting rod 142 of the driving member 14.

Figure 7:
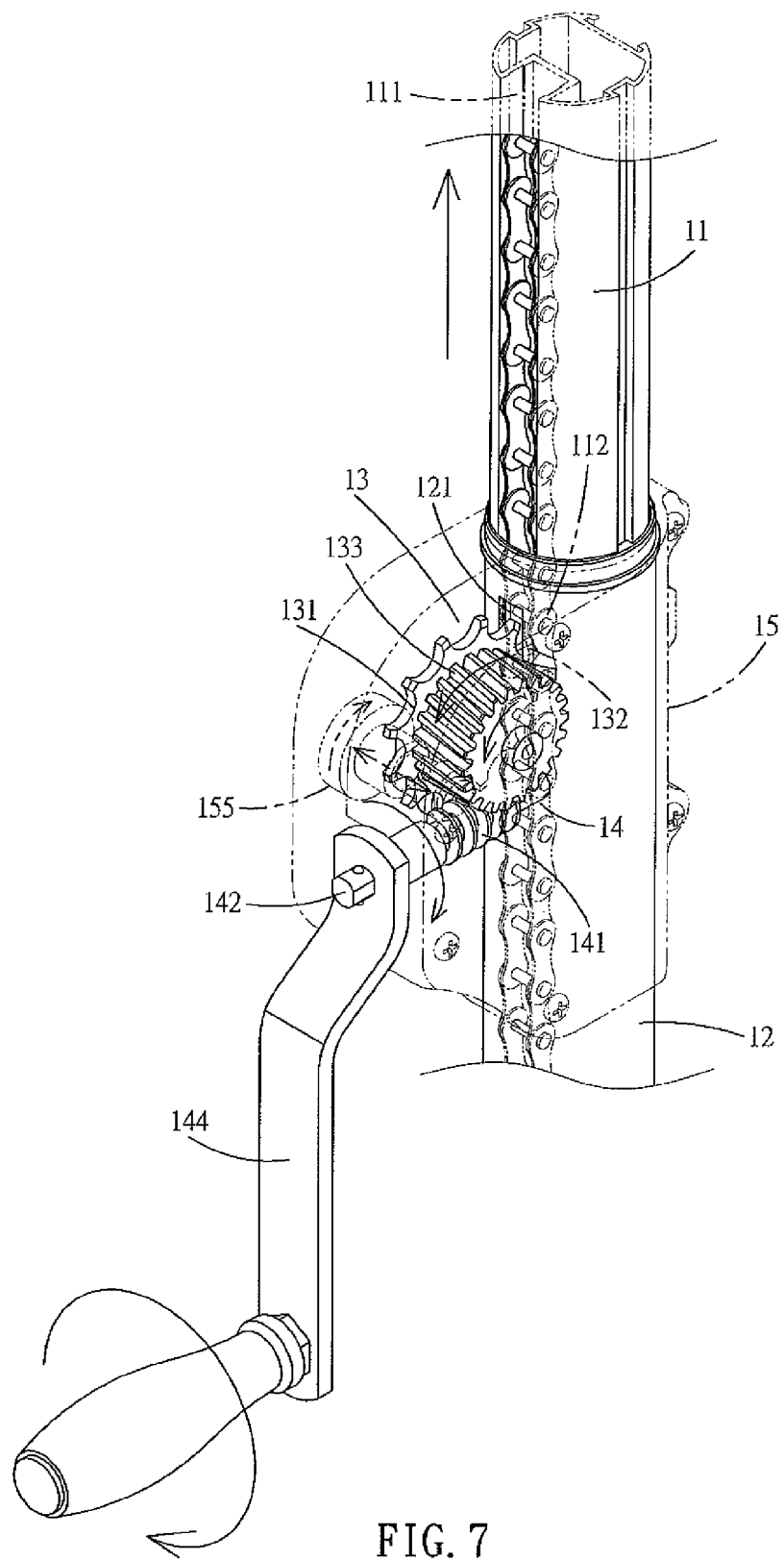
FIG. 7 is a schematic operational view of the telescopic stand as shown in FIG. 4 in adjustment.

In operation, referring to FIG. 7 with reference to FIGS. 1-6, when the rocking arm 144 is rotated, the worm 141 of the driving member 14 is driven to rotate the worm gear 133 which rotates the chainwheel 131 which drives the chain 112 which drives the inner tube 11 so that the inner tube 11 is moved upward or downward relative to the outer tube 12 so as to adjust the height of the inner tube 11 relative to the outer tube 12. In such a manner, the chainwheel 131 meshes with the chain 112 solidly and stably so that even when the inner tube 11 bears a heavy load, the chainwheel 131 co-operates with the chain 112 to withstand the larger force applied by the inner tube 11 and will not be worn out or broken due to an excessive force, thereby increasing the efficiency of transmission, and thereby enhancing the lifetime of the telescopic stand 10.

After adjustment of the height of the inner tube 11 relative to the outer tube 12, the safety latch 155 is rotated by a user so that the safety latch 155 is extended and locked in one of the arcuate grooves between the engaging teeth 132 of the chainwheel 131 of the driven member 13 to lock and stop rotation of the driven member 13 so as to stop movement of the inner tube 11 relative to the outer tube 12. In such a manner, the engaging teeth 132 of the chainwheel 131 of the driven member 13 mesh with the chain 112 solidly and stably. On the contrary, when the safety latch 155 is rotated reversely, the safety latch 155 is retracted and detached from one of the arcuate grooves between the engaging teeth 132 of the chainwheel 131 of the driven member 13 to unlock the driven member 13 so that the driven member 13 can be rotated freely to move the inner tube 11 relative to the outer tube 12 so as to adjust the height of the inner tube 11 relative to the outer tube 12.

Accordingly, the engaging teeth 132 of the chainwheel 131 of the driven member 13 mesh with the chain 112 solidly and stably so that even when the inner tube 11 bears a heavy load, the chainwheel 131 co-operates with the chain 112 to withstand the larger force applied by the inner tube 11 and will not be worn out or broken due to a larger rotation force. In addition, the safety latch 155 is extended into and locked in one of the arcuate grooves between the engaging teeth 132 of the chainwheel 131 of the driven member 13 to lock and stop rotation of the driven member 13 so as to stop movement of the inner tube 11 relative to the outer tube 12 and to provide a safety locking function. Further, the inner tube 11 is provided with a scale 113 to facilitate the user adjusting the height of the inner tube 11 relative to the outer tube 12.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A telescopic stand, comprising:

an outer tube, an inner tube, a chain, a housing, a driven member, a driving member, and a safety latch;

wherein the outer tube has a periphery provided with a guiding slot;

the inner tube is movably mounted in the outer tube;

the inner tube has a periphery provided with a regulating track aligning with the guiding slot of the outer tube;

the chain is secured on the regulating track of the inner tube to move the inner tube relative to the outer tube;

the chain is partially exposed from the guiding slot of the outer tube;

the housing is secured on the outer tube;

the housing has an interior provided with a mounting hole mounted on the outer tube;

the housing has two opposite sides each provided with a mounting sleeve for mounting the driven member;

the housing has a periphery provided with a journal for mounting the driving member;

the driven member is rotatably mounted in the housing and supported by the mounting sleeve of the housing;

the driven member has a central portion provided with a protruding shaft rotatably mounted in the mounting sleeve of the housing;

the driven member has a first side provided with a chainwheel and a second side provided with a worm gear;

the chainwheel of the driven member has a periphery provided with a plurality of engaging teeth and a plurality of arcuate grooves defined between the engaging teeth;

the engaging teeth of the chainwheel of the driven member extend through the guiding slot of the outer tube and mesh with the chain;

the driving member is rotatably mounted in the housing and supported by the journal of the housing;

the driving member has a first end provided with a worm meshing with the worm gear of the driven member;

the driving member has a second end provided with a connecting rod connected with a rocking arm;

the connecting rod of the driving member has a periphery provided with a collar mounted in the journal of the housing;

the safety latch is mounted on the housing and is movable into one of the arcuate grooves defined between the engaging teeth of the chainwheel of the driven member to stop rotation of the driven member.

2. The telescopic stand of claim 1, wherein the regulating track extends in a longitudinal direction of the inner tube, and the inner tube has a surface provided with a scale which extends in the longitudinal direction of the inner tube to indicate a height of the inner tube relative to the outer tube.

3. The telescopic stand of claim 1, wherein the outer tube has an inner wall provided with two opposite limit ribs each extending in a longitudinal direction of the outer tube, the inner tube has an outer wall provided with two opposite limit channels each extending in a longitudinal direction of the inner tube, and each of the limit channels of the inner tube is slidable on a respective one of the limit ribs of the outer tube to allow an axial movement of the inner tube relative to the outer tube and to prevent the inner tube from being rotatable relative to the outer tube.

4. The telescopic stand of claim 1, wherein the outer tube has a top provided with a retaining flange, the housing has a top provided with a retaining groove abutting the retaining flange of the outer tube, and the retaining groove of the housing is connected to the mounting hole.

5. The telescopic stand of claim 1, wherein the safety latch is located adjacent to the mounting sleeve of the housing, the safety latch has a first end provided with a rotatable latch head and a second end provided with a latch rod that is extended outward or retracted inward by rotation of the latch head, and the latch rod of the safety latch is aligned with and movable into one of the arcuate grooves between the engaging teeth of the chainwheel of the driven member.

* * * * *